United States Patent Office 3,398,676
Patented Aug. 27, 1968

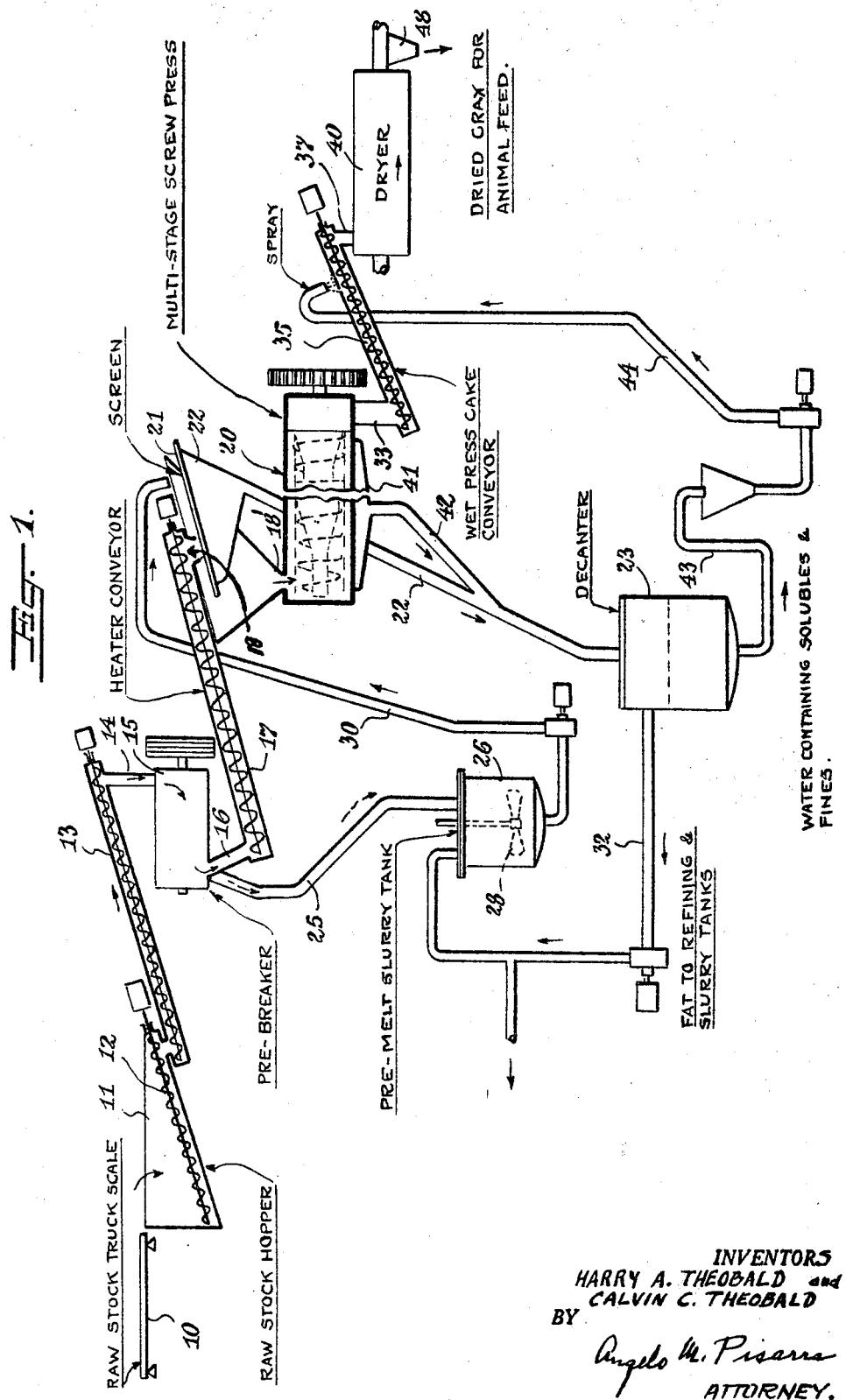

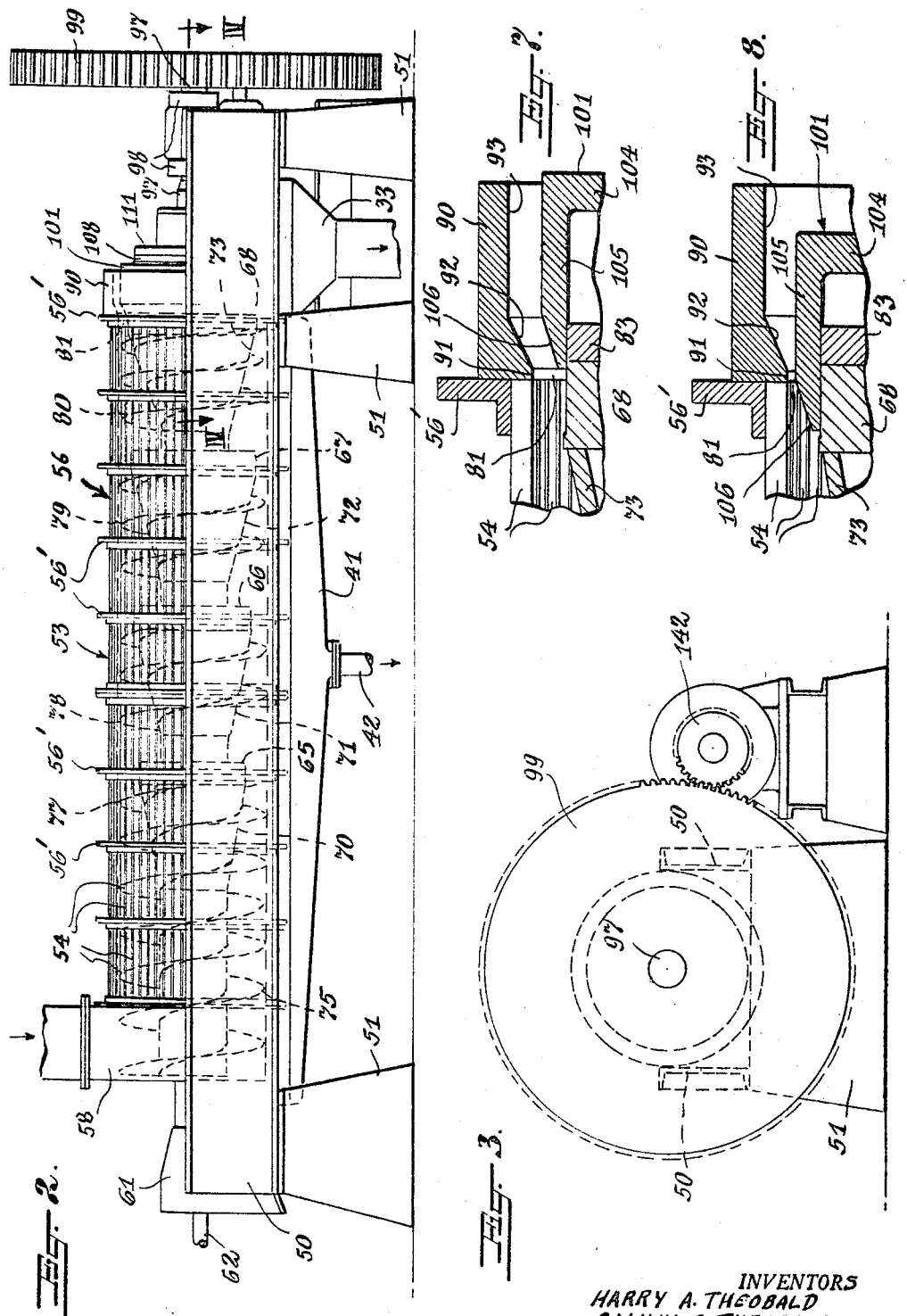

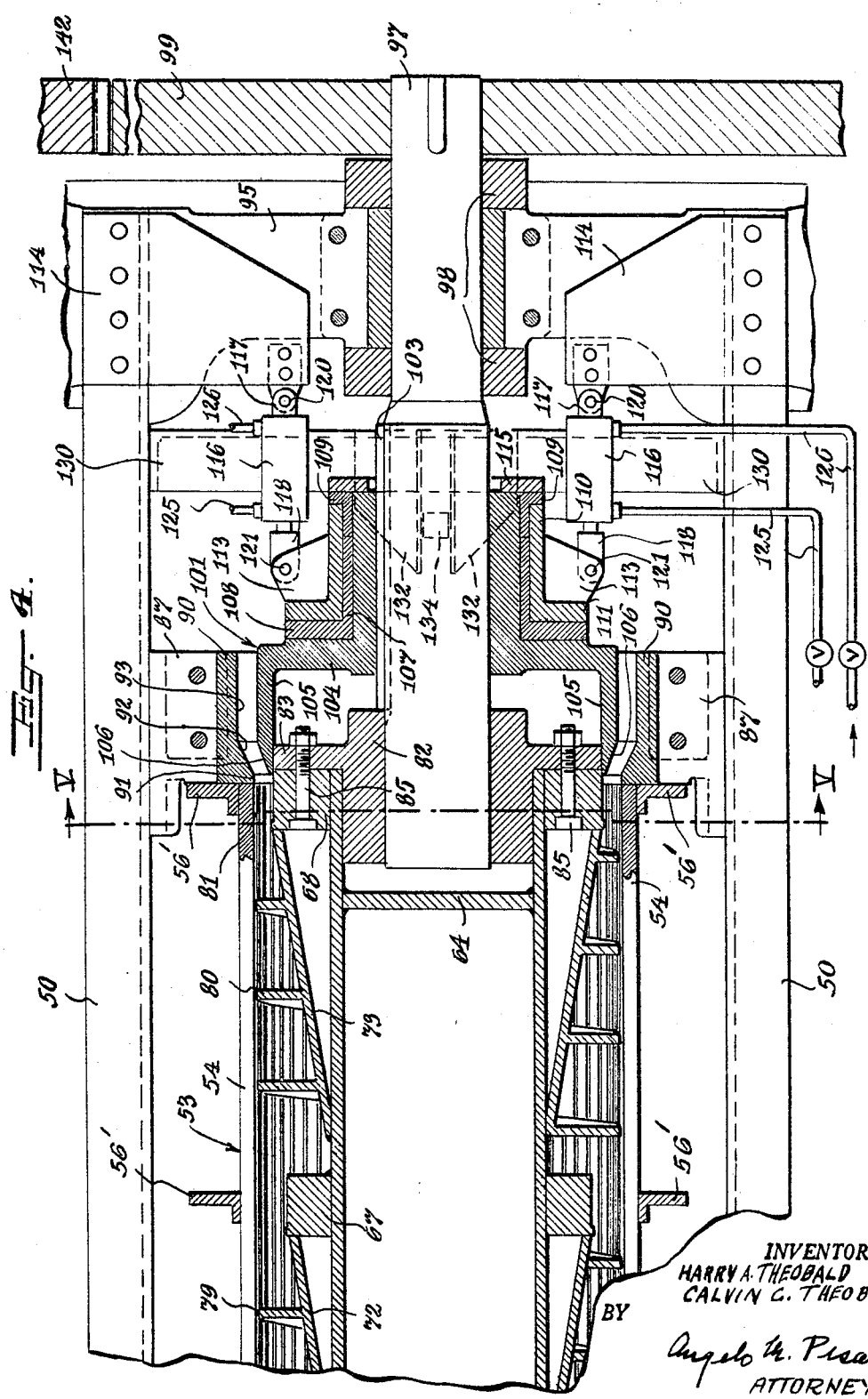

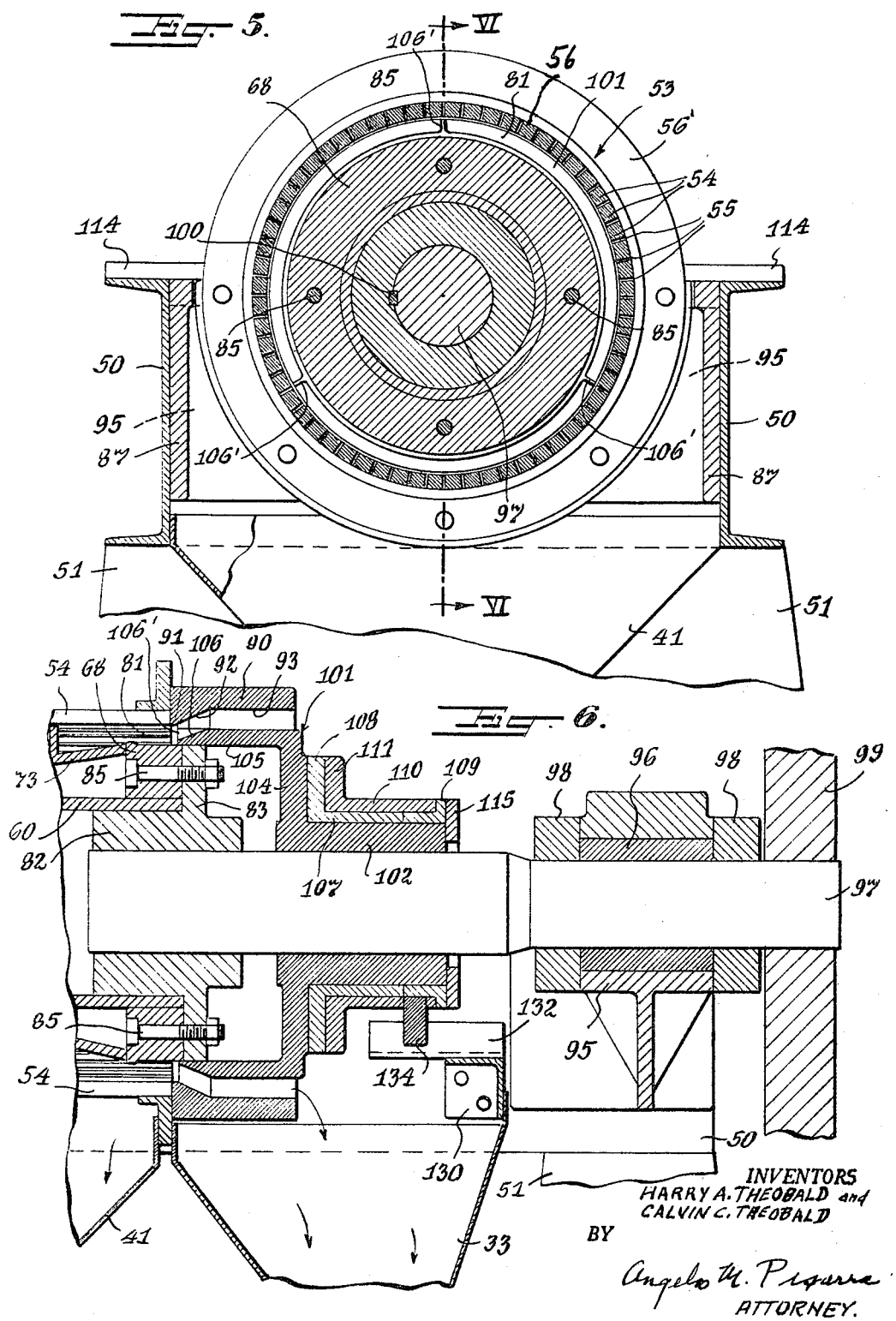

3,398,676
APPARATUS AND METHOD FOR RENDERING
ANIMAL MATERIALS
Harry A. Theobald, 164 Hoyt St., Kearny, N.J. 07032,
and Calvin C. Theobald, Kearny, N.J. (P.O. Box 68,
Doctor's Inlet, Fla. 32030)
Filed Aug. 20, 1963, Ser. No. 303,384
6 Claims. (Cl. 100—37)

ABSTRACT OF THE DISCLOSURE

The invention is directed to methods and apparatus for continuously rendering animal material comprising in a continuous operation reducing said material to such size that at least 90% by weight thereof is in pieces of about 2"–½", then heating said material to a temperature in the range of about 140°–250° F. without reducing the water content thereof by more than 40% by weight of that originally in said material and without reducing the fat content thereof by more than 65% by weight of that originally in said material and then while in said condition subjecting said material to increasing pressures to express molten fat and water therefrom and to provide a residue whose fat content is no greater than 20% by weight thereof on an anhydrous basis, recovering said expressed fat and also recovering said residue.

---

This invention relates to the art of rendering animal material which among others includes shop fat and bones, slaughter house waste, dead stock, poultry, offal and the like. The animal material with which this invention is concerned does not include fish or other marine life and consequently the term "animal material" as used in the present description and claims does not include fish or other marine life. In one of its more specific aspects the invention is directed to novel aspects and methods for rendering animal material primarily for the recovery of fat and also commercial useful proteins and residues therefrom.

The rendering of animal material especially for the recovery of fats therefrom has been practiced for centuries. One of the very old methods which has been employed and is now employed to a very limited degree, if any, is known to the art as the "wet rendering" process. It is a batch process and consists essentially of boiling in water a batch of raw animal material to be rendered at atmospheric or super-atmospheric pressures for periods up to 24 hours or more thereby to liquefy and separate from the remainder of said animal material practically all of the fat component originally contained therein. Then the resultant mass is allowed to settle whereupon the solids thereof settle to the bottom of the aqueous medium and the molten fat floats to the top of the aqueous medium. The molten fat layer is removed from the solids containing aqueous layer. The solids containing aqueous layer contains a residue consisting of water soluble and water insoluble components and is now subjected to evaporation thereby to drive off the water and to leave behind a substantially dry, solid, substantially fat-free residue. This solid residue is then comminuted to appropriate size suitable for use as animal feed and/or fertilizer. This type of rendering process is not economically feasible today in the rendering industry primarily because the massiveness of the plant required, the high cost of operation and low efficiency.

Another and more popular process, which for many years has found acceptance in this art, is the so called conventional "dry rendering" process. This process in one form or another has been almost universally adopted by the industry. This process like the "wet rendering" process is also a batch process and consists essentially of the following steps:

A batch of raw animal material to be rendered is broken or cut up into pieces of appropriate size. Then this batch of pieces is charged into a "cooker" vessel which may be open to the atmosphere or may be of the so called closed type. The pieces in said vessel are agitated, and over about a one hour period, heated to a temperature in excess of 275° F. and conventionally in the range of about 280°–300° F. and maintained in said temperature range for about another hour while being agitated. When a "cooker" of the so called closed type is used, it is usual to maintain said vessel under slightly reduced pressure conditions while in said temperature range over said two hour period. In either case, when the "cooker" is open or closed, due to the high temperatures at which said pieces have been elevated over said two hour period, the hard bone pieces if any, originally present in said batch, have been softened, the cells of said pieces have been ruptured whereupon the water and fat components originally combined therewith have been released. Practically all, that is, more than 80% of the water component has been removed by vaporization from said mass and "cooker" and the fat content is now in the molten condition therein. The "cooker" vessel has a drain which is now opened to permit molten fat to drain from said vessel and is recovered. In this step at least about 60% or more of the fat originally contained in said mass will drain off leaving behind in said "cooker" a residual mass having a moisture content no greater than about 5% by weight thereof, and a fat content no greater than about 25%. The water present apparently is water that was entraped or otherwise held and prevented from being expelled and removed from said mass during said two hour period, and the fat present is apparently absorbed in or absorbed on the remainder of said residue and therefore did not escape from said vessel in said draining operation. Said residue ordinarily is treated in either one of two conventional ways for recovering additional fat therefrom and to make the residue more suitable as an animal feed, for commercially economical purposes. One way employed by plants of modest size is to charge said residue into a press of the old and well known wine press type. Employed to a greater degree and in plants of considerable size is an expeller such as the well known so called Anderson expeller. Similar expellers and presses are widely employed in the expression of oils from seeds and the like. They are characterized by being machines of low capacity and high power requirements. By employing such devices as the so called wine press and Anderson expeller it is possible to squeeze fat out of said residue to produce a mass containing about 15 % fat. The other but more costly method of extracting the fat from said residue is one of solvent extraction. In this, the hot residue is conveyed into agitated vessels and a batch thereof is charged therein for filling same to approximately ½ of its capacity. The practical balance is made up with a suitable solvent such as a low boiling paraffin hydrocarbon. The resultant mass is agitated for a short period of time and then allowed to rest after which Miscella, a solution of the fat component in hydrocarbon solvent, is pumped off. Then the resultant residue is subjected to one or more additional extractions with such solvent. All of the solutions of fat in the hydrocarbon solvent are collected. After the last extraction with hydrocarbon solvent, the resultant residual mass is agitated for about one hour while the vessel is heated under vacuum to vaporize off the residual solvent which is also collected leaving behind a substantially solvent free residue which is then purged with live steam and dried for 15 minutes. The resultant dried residue is then comminuted into particles of predetermined size making it useful as animal feed. The collected solution of fat in solvent is subjected to vacuum distillation whereby the solvent is driven off, condensed and returned to storage for reuse leaving behind the extracted fat. Because the solvent extracts color bodies in its use as an extractant herein and said color bodies remain behind and dissolve in the fat after the distillation of the solvent therefrom the fat usually is substandard, has poor color, and considerable fatty acid content which causes it to be of low grade.

This "dry rendering" process has a number of disadvantages besides those hereinbefore set forth and the following are some of them:

In the course of cooking at 280–300° F. some pyrolysis of the various components of the animal material occurs due to high temperatures employed, ultimately resulting in the down grading of both the fat and residue recovered. This is evidenced by increased peroxide values, discoloration and higher free fatty acid contents of the recovered fat and severe coagulation in the proteinacious matter causing it to be somewhat indigestable for animal feed. It is further believed that a considerable amount of the not well understood growth producing qualities is destroyed and therefore is not present in the ultimate residues recovered, which is a real disadvantage if said residues are to be used as animal feed.

Said wet rendering and dry rendering processes have the further disadvantage of creating industrial nuisances due to the odors created by and emanating from said materials, in the course of processing, and passing into the atmosphere.

Large rendering plants have the raw materials to be rendered delivered to it by large pick-up trucks. These trucks pick-up said materials from "customers" and then transport said materials therein to its rendering plant. The specific type of material picked up and delivered to the plant by the various trucks will vary greatly in content and specific composition. For example, one or more trucks in any one day may pick-up and deliver shop fats and bones with the bone content in one of the trucks differing from that of another; one or more trucks may deliver only offal on that day; one or more trucks may deliver only fallen animals and dead stock on that day; and one or more trucks may deliver only slaughter house waste on that day, etc. As these individual trucks, carrying their respective loads, reach the plant, the ideal plant, which has not been achieved prior to this invention, would permit the unloading of said trucks as they reached the plant, into a single hopper without regard to the particular material in the individual truck, and from this hopper the material would be fed through various processing units to render the material consisting of sizeable loads of significantly different compositions of significantly different physical characteristics and in non-bone solids, bone-solids, water and wat contents.

The present invention has been made to overcome many, if not all, of the deficiencies and disadvantages in the methods and apparatus of the prior art in the rendering of said animal materials and especially those which are know in the art as "inedible" from which are produced the so called humanly inedible products as determined by the U.S. Government pure food and drug regulations.

An object of the present invention is to provide novel and unique methods and apparatus for the rendering of animal material and especially for continuous rendering of animal material.

Another object of the present invention is the provision of novel methods and apparatus for continuously rendering animal material whereby the following advantages are obtainable:

(1) The capital investment of the plant including the necessary equipment, some of which is novel, is nominal.

(2) The efficiency of the plant is high and high yields of commercially marketable products are achieved at minimum cost.

(3) All materials normally to be processed by the industry are processable economically.

(4) Mild flavor fats similar to the fats in the cells, without appreciable increase of fatty acid, darkening of color or loss of bleachability, are recovered.

(5) The residues recovered are rich in protein and have good growth producing qualities.

(6) Wide range of capacity and work as satisfactory with small loads as with large loads of materials.

(7) Very conservative in water requirements, which may be practically non-existent, because no water is required in the practice of the preferential method of this invention.

(8) The process does not create any industrial nuisance, which otherwise would be evidenced by a strong disagreeable odor in the atmosphere.

(9) The use of organic solvent is eliminated thereby eliminating cost of solvent loss and recovery as well as danger of fire and explosions attendant to processes in which such solvents are employed.

Another object of this invention is to provide a novel and unique press for continuously pressing and recovering fat and useful residues from the animal materials to be rendered.

According to this invention, the material collected from the "customers" by the rendering plant pick-up trucks are charged into a hopper as they reach the plant. Then in a continuous manner, the material in the hopper is fed to a pre-breaker wherein the materials are cut, broken up or otherwise converted into pieces of reduced size preferably such that the maximum dimension of the pieces represent at least 90% by weight thereof is no greater than 2". While said raw animal material may be reduced to pieces of very small size, the present invention does not require such fine reduction as required by some recently proposed processes. A salient and important characteristic of this invention is that it is permissible to process relatively large pieces. According to this invention said animal material is reduced to such size that the resultant pieces representing at least 50% by weight thereof have a greatest dimension of at least one-half inch and said pieces representing at least 90% by weight thereof have a greatest dimension no greater than about 2 inches, and for most purposes the greatest dimension of the individual pieces representing about 70% by weight therein of the range of about ½–2 inches which is one of the factors which contributes towards the efficiency and the economical aspects of the invention. In fact, by following the novel methods of this invention, it is possible to process a load of shop fats and bones in the continuous operation even when the proportion of bones in said load measures as high as 50% or more by weight thereof. And even when such material is a charge-part of the continuous process, the size of the pieces may be such that 70% by weight thereof have a greatest dimension in the range of ½–2 inches. Said material of reduced piece size is continuously discharged from said pre-breaker and continuously heated to a temperature of at least about 140° F. and no greater than about 250° F. and preferably in the range of about 140° F.–210° F. and optimumly at about 190° F.–210° F. Said pieces are heated to said temperature throughout and the residence time of said pieces being heated is controlled so that at the end of said heating step the water content in said pieces is at least 60% of that originally contained therein as said pieces are discharged from said pre-breaker. If live steam is employed as the heating medium, and water is condensed in the pressure vessel in the course of continuous heating of said pieces, the water content of said pieces is controlled so that it does not exceed 60% of the weight thereof. And, in either case, the material at elevated temperature is screened or not and charged into a novel press. When screened, molten fat is drained off and measures no more than about 65% of that in said material as it leaves the pre-breaker. The heated pieces in the aforesaid condition and containing water measuring at least 25% by weight thereof are fed into a novel press wherein they are subjected to progressively increasing pressures either in one stage or a plurality of stages whereby fat components and some water therein is expressed therefrom and recovered and the resultant residue so produced is recovered and has a fat content measuring no greater than 20% and preferably no greater than 10% by weight thereof on an anhydrous basis. While in most cases it is preferred that the fat content of the residue be no greater than 10%, it may sometimes be desirable that such fat content be above 10% and between about 15–20% when said residue is to be used as a dog or cat food component. Ordinarily said residue containing no greater than said 10% fat content is then subjected to drying and grinding to provide a comminuted product useful as such as fertilizers or animal feeds. Because the pieces reaching the press have not been subjected to excessively high temperatures for long periods of time and have not been subjected to excessive quantities of water at elevated temperature, pyrolysis and consequent degradation of the components therein, darkening, increase in fatty acid content, and reduction in bleachability have been minimized. And the leaching out of water soluble proteins and other useful water-soluble factors has been reduced. The amount of water recovered during the pressing operation when the preferential method is used, is low thus reducing the percentage of water-solubles removed and the amount of water to be treated.

Certain specific methods for practicing this invention, as well as novel apparatus of this invention are herein set forth by way of illustration and not limitation and are shown in the drawings by way of illustration and not limitation.

FIG. 1 is a flow sheet with diagrammatically shows novel apparatus for practicing the present invention.

FIG. 2 is a side view of a novel press for continuously pressing material continuously fed thereto and illustrates a specific aspect of this invention.

FIG. 3 is an end view of the right side of FIG. 2 as shown on same drawing.

FIG. 4 is an enlarged horizontal cross-sectional view taken on line IV—IV of FIG. 2 in the direction of the arrows.

FIG. 5 is a vertical cross-sectional view taken on line V—V of FIG. 4 in the direction of the arrows.

FIG. 6 is a vertical cross-sectional view taken on line VI—VI of FIG. 5 in the direction of the arrows.

FIG. 7 is an enlarged fractional view showing the extreme open position of the choke.

FIG. 8 is a view like FIG. 6, except that it shows the extreme close position of the choke.

As shown in the drawings, apparatus which may be employed in the practice of this invention comprises the novel combinations shown and include certain novel units as parts thereof. Referring to FIG. 1 there is a weighing scale 10 on which animal material to be rendered is weighed. The truck together with its contents are weighed thereon and then raw stock is dumped from the truck into a receiving and supply hopper 11 at the receiving end thereof. Located in hopper 11 is a feed screw 12 which by an appropriate variable speed drive continuously feeds said raw stock from said hopper 11 into the receiving end of a screw conveyor 13 which by an appropriate drive continuously feeds said raw stock to and through its discharge port 14 and into the receiving end of an appropriately driven continuously operating pre-breaker 15. The pre-breaker 15 serves to break up the raw stock into pieces of the desired size. In this combination, there is employed a pre-breaker known as "Rietz PB–15" well known to the art. The pre-breaker 15 is set so that the size of the pieces which are continuously discharged therefrom at the discharge end are such that the maximum dimension of the pieces representing at least 90% by weight thereof is no greater than 2" and at least 50% by weight thereof is represented by pieces whose greatest dimension is at least ½".

The mass is continuously discharged from the pre-breaker 15 through its discharge port 16 and into the receiving end of a heater 17 in which said mass is heated to a temperature in the range of about 140°–250° F. and preferably 140° F.–210° F. and most preferably about 190°–210° F. and while at said elevated temperature may be discharged through its discharge port 18 and into the receiving end of a novel press 20. It is preferred that the pieces be heated throughout to a temperature which is not in excess of 210° F. but above 140° F. which also contributes to the efficiency and the economical aspects of the present invention. The heater 17 may be any one of a number of different types, and may be the steam jacketed-cylinder type having a heated screw therein for continuously advancing and heating the material fed thereto through said heater to the discharge end thereof, or it may be an ordinary screw conveyor consisting of a cylinder, or trough, and a continuously operable feed screw and into which live steam may be admitted for raising the temperature of the pieces therein to the elevated temperature in said temperature range.

Whatever type of heater 17 is employed, the mass is continuously fed through said heater 17 and onto an inclined vibrating screen 21, as shown in FIG. 1, covering a fat receiver and chute 22 whose discharge end is connected to a decanter tank 23. As said pieces reach said screen and are shaken thereon, the liberated molten fat component, some water and fines pass through the screen and flow into the decanter tank and the pieces of reduced fat content now slide off the screen and pass into the receiving end of the novel press 20. The rate that the temperature of the pieces of reduced size is elevated in said heater 17 to a temperature in said range throughout substantially the entire mass of said pieces, without releasing and evaporating therefrom an amount of water measuring more than about 40% of the water originally contained in said raw material to be renedered and without releasing and removing therefrom an amount of fat measuring more than about 65% of that originally contained in said raw material to be rendered, is controlled. Thus, by controlling the temperature of the heater 17 and the residence time of the pieces of reduced size being continuously fed through the heater 17 to the novel press 20, the mass is elevated throughout to a temperature in said range and while in said temperature range is continuously fed into the receiving end of the press 20, while still containing at least about 60% of the water and at least about 35% of the fat originally contained in said raw animal material to be rendered. The mass fed into the receiving end of said press is characterized by being in said temperature range so that no appreciable degradation of the components therein has occurred.

Instead of continuously discharging the mass from the pre-breaker 15 into the heater 17, an alternate route may be employed. In said alternate route the mass may be continuously discharged from pre-breaker 15 through a discharge chute 25 and into a pre-melt slurry tank 26 containing a quantity of molten fat therein preferably maintained at 200°–210° F. The tank 26 has a rotary blade mixer 28 therein which constantly mixes together the fat and mass continuously fed thereto whereby a mixture is being constantly produced therein. The mixture in tank 26 is continuously pumped from tank 26 through conduit 30 onto the screen 21 where as before the free molten fat, some water and fines flow through screen 21 to a decanter 23 and pieces of lesser fat content slide into the receiving end of the novel press 20. The fines and water settle to bottom of tank 23 and the fat floats on top and is continuously drawn off through conduit 32 and is continuously pumped in part to tank 26 and in part to a storage tank (not shown) for refining.

Whether the preferred or alternate route is employed, the mass which has been conditioned is now continuously fed into said novel press 20 wherein it is pressed thereby to express therefrom some water, and most of the fat contained therein, thereby to produce a residue which passes through a chute 33 and into the receiving end of a continuously driven screw conveyor 35. The fat, together with some fines and water, fall into a pan 41 having a discharge chute 42, communicating with chute 22, and then pass to decanter 23. The water containing solubles and fines which settle in tanks 23 are pumped as required through lines 43 and 44 onto the wet residue which is being continuously conveyed by the screw conveyor 35. Then the mass in the conveyor 35 is discharged through chute 37 thereof and into the receiving end of a dryer 40.

The dryer 40 which has lifting flights is rotated to lift the wet residue fed therein and cause it to fall vertically downward while being subjected to a stream of hot air and is ultimately discharged through chute 48 and may or may not be ground depending upon its fineness and intended ultimate use.

In one of the specific aspects of this invention there is provided novel apparatus for continuously pressing the material fed thereto. Said novel apparatus comprises a screw press in combination with means for automatically controlling the size of the discharge port thereof in response to pressure exerted by said material at the discharge end of said press. More specifically said novel combination comprises a screw press and preferably a multi-stage screw press in combination with a choke at the discharge annulus thereof together with means for moving said choke forwardly and rearwardly in said annulus thereby to reduce and enlarge the effective size of said annulus, with said means being operable in response to differences between the pressure exerted upon said choke by said material at said annulus and a substantially constant and predetermined pressure applied thereto and exerted thereon in a direction opposite to that exerted thereon by said material.

A specific embodiment of a novel press of this invention, shown by way of illustration and not limitation, is that shown in FIGS. 2–8 of the drawings. The novel press shown consists essentially of a screw press which is of the continuous multi-stage type in combination with means at the discharge annulus or part thereof, together with means for exerting constant predetermined forces upon said means thereby constantly tending to move said first means into said annulus or port thereby tending to reduce the effective size of said annulus or port.

As shown in the drawings there is a well known Renneburg continuous multi-stage screw press, manufactured and sold by Edw. Renneburg & Sons, Company of Baltimore, Maryland which has been modified to provide an illustrative embodiment of a novel press of this invention. The press, shown in FIG. 2–8 comprises a pair of longitudinally extending frame sides 50 which are supported on vertically disposed supporting standards or standions 51. Supported by the frame side supports 50 along the length thereof is a cage 53. The cage 53 is in the form of a cylinder of closely spaced longitudinally extending slats 56 with longitudinally extending openings 55 therebetween for the passage of fluids there through. The cage 53 is in form of two like semi-cylindrical longitudinal sections coupled to each other, with the individual slats of each maintained in position by a plurality of like semi-circular rings 56' which also serve as reinforcing elements and elements for coupling the cage 53 to the frame sides 50. One end of the cage 53 has a feed hopper 58 coupled thereto and in communication therewith for the admission into said cage 53 of material to be pressed. A hollow drive tube 60 is located in said cage 53 and extends approximately the full length thereof, with its longitudinal axis being coincident with that of said cage 53 and with the outer periphery thereof being spaced from the interior of said cage 53. One end of said tube 60 terminates in a journal extending through one side of said hopper 58 and is rotatably supported in a bearing carried by a frame end 61. A conduit 62 is supported by the frame end 61 and is coupled with said journal having an opening therethrough for admission of steam or other fluid heating medium into said drive tube 60. The tube 60 has an interior closure 64 near one end thereof to prevent the escape of the heating fluid from that end. The drive tube 60 has a plurality of, and as shown, four cylindrical collars 65, 66, 67 and 68 secured thereto and spaced from each other along the length thereof. Said collars are of progressively increased external diameter going in the normal direction of feeding, when said press is in operation. Four frusto-conical hollow elements 70, 71, 72 and 73 whose ends of smaller external diameter are substantially the same and whose ends of large external diameter correspond with the external diameter of the respective collars 65–68 to which they are secured, are mounted on and locked to the tube 60. The smaller end of each of said elements 70–73 is located an appreciable distance from the next preceding collar carried by said tube 60. That portion of the tube 60 in the hopper 58 and in that portion of the cage adjacent said hopper has secured thereto a screw flight 75 of substantially constant pitch and outside diameter. This screw 75 is joined at one end to a screw flight 77 constant outside diameter. Screw flights 78, 79 and 80 respectively, are secured to the frusto-conical elements 71, 72 and 73. Said flights 78, 79 and 80 are of different internal diameters but of the same external diameters as flights 75 and 77.

According to this invention, the Renneburg press aforedescribed is modified as follows to provide a novel press, an embodiment of which is shown in FIGS. 2–8:

The length of the cone 73 and flight 80 have been shortened and the length of the collar 68 has been increased thereby to provide an annulus or port 81 of greater length. The length of the collar 68 is such that it extends materially beyond the outer extremity of the cage 53. An internal drive collar 82, having an external flange 83 integral therewith, has a portion thereof extending into the drive tube 60 externally of the closure 64. The flange 83 is annular and its outside cylindrical surface is in registry with the outside surface of collar 68 and together said surfaces provide a bearing surface. The collar 82 is secured to the drive tube 60 by means of lock bolts 85 extending through collar 68 and flange 83. Secured to the frame sides 50 are holding plates 87 which carry cylinder or ring 90 and maintain said cylinder 90 in abutting position against the outer edge of cage 53 and the outer ring 56 thereof. The ring 90 has a short internal cylindrical surface 91 in registry with the interior surface of cage 53 at the outer extremity thereof, then has an interior surface 92 of gradually increasing diameter over an appreciable length thereof thereby defining an internal frusto-conical portion and finally terminates in an internal cylindrical surface 93 of still greater length and of a diameter corresponding to the greatest diameter of said surface 92. A casting support 95 is secured to the frame sides 50 and extends therebetween. The support 95 carries an internal bushing 96 through which extends one end of a drive shaft 97. Secured to the shaft 97 at either side of the bushing 96 and casting 95 are positioning collars 98. The shaft 97 extends outwardly beyond the casting support 95 and has a bull gear 99 secured thereto for driving said shaft 97. The other end of said shaft 97 extends through the central opening in collar 82 and is operatively coupled thereto by being shrunk-coupled therewith and/or by internal key 100. Concentrically mounted on and rotatable with said shaft 97 is a choke 101 which includes a collar 102 keyed to the shaft 97 by key 103. Integral with said collar 102 is an annular flange 104 which in turn has integral therewith a cylinder 105 the outer surface of whose forward free end is in the form of an incline or cone 106. The outside diameter of cylinder 105 is slightly less than the inside diameter of cage 53. Integral with or otherwise secured to incline plane 106 are a plurality of raised hard faced knives, ribs or bars 106' which are preferably narrow and shallow and extend the full length of the incline plane. The elements 106' extend along said inclined surface at an angle no greater than about 150° to a line formed intersecting said cone 106 with a plane at right angles to the axis of rotation thereof will in the employment shown said element 106' are at right angles to that line. The thickness of elements 106' is such that the effective end of choke 101 may be fully inserted into the discharge opening 81 as shown in FIG. 8. The interior cylindrical surface of the part 105 of choke 101 bears on the outside cylindrical surface of the flange 83 and the outside cylindrical surface of collar 64 which together provide a slide-bearing therefore. The length and inclination of the surface 106 are substantially the same as the length and inclination of the surface 92; the length of the remainder of the outside surface of the part 105 is substantially the same as that of the surface 93; and the interior diameter of the ring 90 is such and ring 90 is so disposed relative to the discharge end of cage 53 as shown in FIG. 4, that when choke 101 is in its maximum retracted position as shown in FIG. 4, the distances between surfaces 92 and 106 and between 93 and the remainder of the outside surface of part 105 are substantially the same. The said maximum retracted position, as shown in FIG. 4, and also shown in FIG. 5, shows that said surfaces 92 and 106 together define an inclined port communicating with port 81 and port formed by the exterior surface of the remainder of part 106 together with surface 93, with the port 81 and said last port being of approximately the same width and with the incline port therebetween being of a smaller widthwise dimension at the forward end thereof. Mounted on said collar 102 is a cylindrical bushing 107 having a forward annular flange 108 integral therewith and bearing against the outer side of flange 104 and having a shorter rear annular flange 109. A thrust ring 110 together with a thrust flange 111 integral therewith, is disposed on the bushing 107, with the flange 111 bearing against the outer surface of flange 108 and the outer edge of ring 110 bearing against the inner surface of flange 109. A retaining ring 115 is bolted or otherwise secured to collar 102 and faces against collar 102 and part 109 to maintain the bushing 107 in position. Integral with said ring 110 and flange 111 are a pair of diametrically disposed gusset plates 113 having transverse openings therethrough. A pair of oppositely disposed large gusset plates 114 are secured to the frame sides 50.

A double acting hydraulic cylinder 116 connects each of the gusset plates 113 with the large gusset 114 opposite thereto. Each cylinder 116 has a clevis 117 secured to the end of the chamber thereof and a clevis 118 secured to the piston rod thereof. The clevis 117 is coupled to the gusset 114 by a clevis pin 120 and the clevis 118 is coupled to the gusset 117 by a clevis pin 121. Each of the hydraulic cylinders has a pair of ports which are connected to hydraulic or air lines 125 and 126 which are connected to a variable hydraulic or compressed air system for maintaining said cylinders 116 under pre-set pressure thereby constantly to maintain the choking device under pre-set and predetermined constant pressure in a direction towards said cage 53. A cross channel 130 is located below drive shaft 97, is secured to the frame sides 50 and has a pair of spaced torque arm guides 132 secured thereto. Disposed in the space between guides 132 is one end of a locking key 134 whose other end is secured to the thrust ring 110 to prevent rotation of ring 110 while choke 101 is rotated, but permits the entire, sub-assembly of choke 101, bushing 107 and thrust ring 110 to be actuated back and forth along shaft 97. The bull gear 99 is driven by a pinion gear 142 of a conventional variable speed drive mechanism which is presettable to drive said shaft at any desired pre-set and predetermined speed.

The operation of the press is as follows:

The press 20 may be heated by feeding live steam into the hollow drive tube 60 through pipe 62, and said heating may be maintained throughout the continuous operation of the press to assist in maintaining the temperature of the mass continuously fed thereto at a temperature in said range, and after passing over screen 21. The main variable speed drive is energized whereby the pinion 142 drives bull gear 99 at a predetermined constant speed. Gear 99 in turn drives the shaft 97 together with the drive tube 60 and flights and collars carried thereby and also the choking device 101. The hydraulic or air system which also was pre-set and in operation applies a predetermined fluid pressure to cylinders 116 whereby the rotating choking device 101 is actuated towards the discharge annulus 81 and in the absence of any material discharging through annulus 81, the inclined end thereof carrying ribs 106' enters said annulus and substantially closes off said annulus 81 except for the space between the incline 106 and the outer faces of ribs 106'. The forward travel of the choke 101 is limited by the length of the maximum stroke of the cylinders 116. The mass at said elevated temperature is thus continuously fed into the hopper 58 and into the feed end of the cage 53 whereupon it is fed forwardly by flight 75 into the first stage of the press where flight 77 is located. Because of the progressive decreases in the volume of the press at this stage, the mass is subjected to progressively higher pressures causing molten fat and some whater to be extruded through slat openings 55. Then said material is continuously forced from said first stage into the second stage. On its travel from the first to the second stage, the pressure thereon is reduced and the material turns over thereby exposing new surfaces to the cage 53. Here again because of the decrease in volume of the press where flight 78 is located at this second stage, the pieces are again subjected to progressively increased pressures, again causing molten fat and water to be expressed therefrom through slat openings 55. The volume of the press in this second stage being less than that of the first stage results in the exertion of higher maximum pressures in the second stage than those developed in the first stage. Then said material which has been subjected to higher maximum pressure in the second stage passes into the third stage and in the course of this passage pressure thereon is released or greatly reduced and the material turns over and is now subjected to still higher pressure in this third stage due to the decrease in volume of the press in this stage. This is repeated in that last and fourth stage where the material is subjected to its greatest pressure and for the greatest residence time whereby the maximum amounts of liquids are pressed out through the openings between slats 56. In all of these stages, molten fat and some moisture as well as some fines are expelled from the material through the openings between slats 56 which expelled materials are caught in the trough 41 which extends along the full length and diameter of cage 53 and is located therebelow. A wet residue is continually extruded and discharged through opening 81 and into chute 33.

When certain materials to be rendered, such as those containing high percentages of fat or offal and the like, were to be pressed in this apparatus in the absence of the application of choke 101, such materials when in the last stage of said press would not be subjected to the necessary or desired high pressures and residence time therein. Consequently, insufficient amounts of the liquids would be removed therefrom and therefore the wet residue passing out of discharge annulus 81 would not be acceptable because of its excessive fat content, and therefore such a press in the absence of the application of choke 101 would be unsatisfactory for the purposes intended.

The rate of discharge of the wet residue out of the annulus 81 is controlled by the effective front end of the choke 101. The constantly rotating choke 101 which is constantly maintained under a pre-set and predetermined substantially constant pressure in a direction opposite to the direction of feeding of said wet residue out of annulus 81, is subjected to pressure in the opposite direction by action of successive increments of the wet residue under pressure as they reach annulus 81. When the pressure exerted by said residue on the front end of said rotating choke 101 exceeds the pressure applied to said rotating choke by the cylinders 116, the inclined or front end of the rotating choke 101 is to some extent moved rearwardly thereby to increase the effective discharge opening defined by the inner face of cage 53 at the outer end thereof and the incline 106 of the rotating choke 101. As this differential in said pressure increases, the rotating choke 101 is forced rearwardly still further whereby the effective discharge openings increases proportionally.

When the pressure exerted by said residue on said rotating choke 101 is less than that exerted on said rotating choke 101 by cylinders 116, the choke moves forwardly to some extent towards cage 53 thereby to reduce to some degree the effective annular opening between cage 53 and incline 106. As this differential in said pressure decreases, the rotating choke 101 is forced still further forwardly in that direction thereby to reduce still further the size of the effective annulus between cage 53 and incline 106. In the aforesaid manner, the action of the choke 101 serves to control the flow and character of the residue from the fourth and last stage of said press. It serves to cause the material in said fourth stage to be subjected to the maximum desired pressure and residence time at said pressure whereby the maximum amount of liquids are expressed therefrom through openings between slats 56 at this stage thus producing a wet residue of sufficiently low fat content as to be commercially acceptable.

The choke 101 in conjunction with the fourth stage of said press forms what may be regarded as a chamber for compensating for variations in the effectiveness of the previous stages due to the variations in the compositions of the materials being pressed, wherein the materials are held in residence in said chamber at maximum desired pressure for various periods, times depending upon the material in said chamber for the aforesaid purposes.

The elements 106' serve to break such longer bones which are forced into the discharge opening of the press and tend to or do clog that opening and further serve to act as a reaming device continuously to clean out and maintain the effective discharge opening in proper condition. Such long bones or the like which reach the discharge opening are broken up by the action of the rotating elements 106' and these elements acting together with the slat 56 at the discharge end of the press prevent the clogging of the discharge opening for unduly long periods of time.

In the practice of this invention, a batch-load or increment weighing 1000 pounds was continuously processed in the manner heretofore described and employing the apparatus described. This particular 1000 pound increment consisted of a mixture of 500 pounds of shop fats and 500 pounds of shop bones and of the following analysis, by weight, with the "solids" being fat free solids:

| | Percent |
|---|---|
| Fat | 40.3 |
| Solids | 24.7 |
| Water | 35.0 |

After being subjected to the action of the pre-breaker 15 and subsequently heated to approximately 190° F. via either route the resultant material at approximately 190° F. sliding off of the screen 21 into the press 20 measures 705 pounds and the remainder 295 pounds which we term "effluent #1" has the following average analysis by weight:

| | Percent |
|---|---|
| Fat | 71.0 |
| Solids | 8.0 |
| Water | 21.0 |

Said 705 pounds of material at approximately 190° F., which we term "pre-rendered stock" has the following average analysis by weight:

| | Percent |
|---|---|
| Fat | 27.5 |
| Soilds | 31.6 |
| Water | 40.9 |

The material expressed from said pre-rendered stock and passing through the hopper 41 which we term "effluent #2" in the pressing of said 705 pounds of pre-rendered stock, maintained at approximately 190° F. therethrough measures 355 pounds and the amount of pressed material or pressed cake extruded through the discharge opening of the press measured 350 pounds.

The effluent #2 has the following average analysis by weight:

| | Percent |
|---|---|
| Fat | 49.6 |
| Solids | 16.4 |
| Water | 34.0 |

The press cake has the following average analysis by weight:

| | Percent |
|---|---|
| Fat | 5.15 |
| Solids | 47.25 |
| Water | 47.60 |

When combined in decanter 23, effluent #1 and #2 weigh 650 pounds and has the following average analysis by weight:

| | Percent |
|---|---|
| Fat | 59.2 |
| Solids | 12.6 |
| Water | 28.2 |

After the pressed cake extruded from the press 20 and measuring 350 pounds was combined with the aqueous layer and fines from decanter 23 and this mass was passed through the dryer 40, the resultant dried crax weighted 309 pounds and had an average analysis by weight of:

| | Percent |
|---|---|
| Fat | 10 |
| Solids | 80 |
| Water | 10 |

The dried crax, if required are then comminuted to the desired finess so that they are ready for bagging and shipment for use as animal feed or fertilizer.

Since certain changes may be made in carrying out the above process, and modifications effected in the apparatus for practicing the principle thereof, without departing from the scope of the invention, it is intended that all matter contained in the above description or shown in the accompanying drawings, shall be interpreted as illustrative and not in a limiting sense.

It is also to be understood that the following claims are intended to cover all the generic and specific features of the invention herein described, and all statements of the scope of the invention, which as a matter of language might be said to fall therebetween.

We claim:
1. Apparatus for continuously rendering animal material comprising:
 first means for supporting a supply of said material to be rendered;
 second means for reducing said material to such size that at least 90% by weight thereof is in pieces whose greatest dimension is no greater than about 2", said second means being continuously operable;
 third means for continuously conducting said material from said first to said second means;
 fourth means for heating said material to a temperature of at least 140° F. and for continuously discharging therefrom said material at said elevated temperature before more than 40% of the water originally contained therein has been removed therefrom, fifth means for continuously conducting said material from said second to said fourth means, in combination with a press, sixth means for continuously conducting into said press said material continuously discharging from said fourth means, said press being continuously operable, having an approximately annular discharge opening at one end thereof and comprising a cage having a plurality of openings for the passage of molten fat and water therethrough, a plurality of continuously rotatable in-line screws for continuously moving said material to be pressed along the length of said cage and for exerting increasing pressures on said material to express molten fat and water therefrom and through said openings in said cage and to extrude continuously through said discharge opening said pressed material and seventh means adapted to be disposed in said discharge opening for reducing the effective size of said discharge opening, each of said screws comprising a cone and a flight carried thereby, a collar disposed at the larger end of each cone, the external diameter of one of said collars being less than that of another downstream thereof, said seventh means when in said discharge opening, adapted to be acted upon by pressure exerted thereon in one direction by said pressed material in the course of its being extruded through said discharge opening thereby tending to move said seventh means in a direction outwardly away from said discharge opening and eighth means for maintaining said seventh means under pressure in a direction opposite to said first mentioned direction whereby said seventh means is movable back and forth in said discharge opening in response to differences between said pressures to increase and decrease the effective size thereof thereby to aid in controlling the residence time of said material in said press and the maximum pressure at which said material is subjected in said press.

2. A continuously operable animal material rendering press comprising:

a screw press comprising a cage having openings therethrough for the passage of liquids out of said cage, a plurality of in-line rotatable screws, a collar at the larger end of each of said screws, the outer surface of one of said collars being cylindrical, located at one end of said cage and spaced therefrom to provide a discharge opening therebetween, said screws being rotatable to move material to be pressed along the length of said cage and to exert increasing pressures thereon to force liquid therefrom and through said openings in said cage, a rotatable shaft for rotating said screws, each of said screws comprising a cone and a flight carried thereby, a collar disposed at the larger end of each cone, the external diameter of one of said collars being less than that of another downstream thereof, means secured to said shaft and rotatable therewith, the outer surface of said means being cylinder and in registry with said first mentioned cylindrical surface, a choke carried by said shaft and rotatable therewith, said choke being movable back and forth along the axis of rotation of said shaft, the effective end of said choke being slideable back and forth on said surfaces, a stationary ring located at the discharge end of said cage, the interior surface of the front end of said ring being inclined upwardly outwardly towards the rear thereof, the surface of the effective end of said choke being inclined downwardly towards the free end thereof, said choke adapted to be moved into said discharge opening and when in said discharge opening the incline surface of said choke being acted upon by pressure of the pressed material forced into said discharge opening by said screw thereby tending to force said choke out of said opening, and means for exerting pressure in the opposite direction upon said screw thereby tending to maintain the effective end of said choke in said opening, said choke being movable back and forth in said opening in response to differences in said pressures thereby to increase and decrease the effective discharge opening.

3. A combination of a multi-stage screw press having an approximately annular discharge opening at one end thereof for the passage of pressed material therethrough and comprising an elongated cage having openings therethrough for the passage of liquids out of said cage, a plurality of rotatable in-line screws connected to each other and located in said cage for moving material to be pressed along the length of said cage and for exerting increasing pressures on said material to express liquids therefrom and through said openings in said cage, each of said screws comprising a cone and a flight carried thereby, a collar disposed at the larger end of each cone, the external diameter of one of said collars being less than that of another downstream thereof, a rotatable shaft for rotating said screws, a choke supported by said shaft, one end of said choke adapted to be located in said opening thereby to reduce the effective size of said discharge opening and to be subjected to pressure in one direction by the pressed material in the course of discharge thereof, and means for maintaining said choke under pressure in the opposite direction whereby said choke is movable back and forth in said opening in response to the differences in said opposing pressures exerted thereon to control the effective size of the discharge opening thereby to control the residence time of the material in the press and the maximum pressure to which it is subjected therein, the outside surface of said choke being inclined and including at least one shallow rib, said choke being operably connected to said shaft for rotation therewith to aid in breaking the pressed material forced into said discharge opening and in acting as a reamer to prevent undesirable clogging of said discharge opening.

4. The method for continuously rendering animal material comprising in a continuous operation reducing said material to such size that at least 90% by weight thereof is in pieces whose greatest dimension is no greater than 2" and at least 50% by weight thereof is in pieces whose greatest dimension is at least ½", then heating said material to a temperature in the range of about 140°–250° F. without reducing the water content thereof by more than 40% by weight of that originally in said material and without reducing the fat content thereof by more than 65% by weight of that original in said material and then while in said condition continuously feeding said material into a continuously operating press, said press having an approximately annular discharge opening at one end thereof and comprising a cage having a plurality of openings for the passage of expressed molten fat and water therethrough, a continuously rotating screw continuously moving said material along the length of said cage and exerting increasing pressures on said material thereby expressing molten fat and water therefrom and through said openings in said cage and thereby extruding continuously through said discharge opening said material in pressed condition and first means having a free extremity, one end of said first means disposed in said discharge opening for reducing the effective size of said discharge opening, the outside surface of said end being inclined downwardly towards said free extremity, said incline surface being acted upon by pressure exerted thereon in one direction by said pressed material in the course of its being extruded through said discharge opening thereby tending to move said first means in direction outwardly away from said discharge opening and second means maintaining said first means under approximately constant pressure in a direction opposite to said first mentioned direction, whereby said first means is moved back and forth in said discharge opening in response to differences between said pressures to increase and decrease the effective size thereof thereby to control the residence time of said material in said press and the maximum pressure at which said material is subjected in said press whereby said material in pressed condition passing through said discharge opening has a fat content of no more than 20% by weight thereof on an anhydrous basis recovering said expressed fat and also recovering said pressed material discharged from said discharge opening.

5. The method for continuously rendering animal material comprising in a continuous operation reducing said material to such size that at least 90% by weight thereof is in pieces whose greatest dimension is no greater than 2" and at least 50% by weight thereof is in pieces whose greatest dimension is at least ½", then heating said material to a temperature in the range of about 140°–210° F. without reducing the water content thereof by more than 40% by weight of that originally in said material and without reducing the fat content thereof by more than 65% by weight of that originally in said material and then while in said condition, continuously feeding said material into a continuously operating press having an approximately annular discharge opening at one end thereof and comprising a cage having a plurality of openings for the passage of expressed molten fat and water therethrough, a continuously rotating screw continuously moving said material to be pressed along the length of said cage and exerting increasing pressures on said material thereby expressing molten fat and water therefrom and through said openings in said cage and extruding continuously through said discharge opening said material in pressed condition and having a fat content no greater than 20% by weight thereof on an anhydrous basis, and first means having a free extremity, one end of said first means disposed in said discharge opening for reducing the effective size of said discharge opening, the outside surface of said end being inclined downwardly towards said free extremity, said incline surface being acted upon by pressure exerted thereon in one direction by said pressed material in the course of its being extruded through said discharge opening thereby tending to move said first means in a direction outwardly away from said discharge opening and second means for continuously maintaining said first means under approximately constant pressure in a direction opposite to said first mentioned direction, whereby said first means moves back and forth in said discharge opening in response to differences between said pressures thereby increasing and decreasing the effective size thereof thereby controlling the residence time of said material in said press and the maximum pressure at which said material is subjected in said press whereby said material in pressed condition passing through said discharge opening has a fat content of no more than 20% by weight thereof on an anhydrous basis, said second means including a plurality of shallow ribs, each of said ribs disposed at an angle no greater than 150° to a line formed by intersecting said inclined surface with a plane at right angles to the axis of rotation of said first means and said rotating ribs aiding in breaking up said pressed material forced into said discharge opening and acting as a reamer to prevent undesirable clogging of said discharge opening, recovering said expressed fat and also recovering said pressed material discharging from said discharge opening.

6. The method for continuously rendering animal material comprising in a continuous operation reducing said material to such size that at least 90% by weight thereof is in pieces whose greatest dimension is no greater than 2" and at least 50% by weight thereof is in pieces whose greatest dimension is at least ½", then heating said material to a temperature in the range of about 140°–210° F. without reducing the water content thereof by more than 40% by weight of that originally in said material and without reducing the fat content thereof by more than 65% by weight of that originally in said material and then while in said condition, continuously feeding said material into a continuously operating press, said press having an approximately annular discharge opening at one end thereof and comprising a cage having a plurality of openings therethrough for the passage of expressed molten fat and water therethrough, a continuously rotating screw continuously moving said material to be pressed along the length of said cage and exerting increasing pressures on said material thereby expressing molten fat and water therefrom and through said openings in said cage and continuously extruding a residue of pressed material through said discharge opening, said residue having a fat content no greater than 20% by weight thereof on an anhydrous basis, a continuously rotating shaft continuously rotating said screw, a continuously rotating choke supported by said shaft and having a free extremity, the outside surface of one end of said choke being inclined downwardly towards the free extremity thereof and located in said discharge opening thereby reducing the effective size of the discharge opening and being subjected to pressure in one direction by the action of the pressed material against said inclined surface in the course of discharge thereof thereby tending to move said end of said choke in a direction outwardly away from said discharge opening to increase the effective size of said discharge opening and means maintaining said end of said choke under pressure in the opposite direction whereby said end of said choke moves back and forth in response to differences between said opposing pressures thereby increasing and decreasing the effective size of said discharge opening thereby controlling the residence time of said material in said press and the maximum pressure to which said material is subjected in said press whereby said residue discharging from said press has a fat content no greater than 20% by weight thereof on an anhydrous basis, said choke including a plurality of shallow ribs carried by said choke and continuously rotating therewith, said rotating ribs aiding in breaking up said residue forced into said discharge opening to prevent undesirable clogging of said opening, each of said ribs being disposed at an angle no greater than 150° to a line formed by intersecting said inclined surface with a plane at right angles to the axis of rotation of said choke, recovering said expressed fat and also recovering said pressed material discharging from said discharged opening.

References Cited

UNITED STATES PATENTS

| | | | |
|---|---|---|---|
| 925,971 | 6/1909 | Wheelwright | 260—412.6 |
| 1,766,033 | 6/1930 | Meakin | 23—280 |
| 2,340,009 | 1/1944 | Meakin | 100—147 X |
| 2,975,096 | 3/1961 | Ginaven et al. | 100—117 |
| 3,230,054 | 1/1966 | Ling | 23—280 |
| 973,324 | 10/1910 | Wannenwelsch | 23—280 |
| 2,268,753 | 1/1942 | Kerr | 100—148 |
| 2,551,034 | 5/1951 | Marriman et al. | 23—280 |
| 2,903,960 | 9/1959 | Zies | 100—148 |
| 3,046,286 | 7/1962 | Speer et al. | 260—412.6 |
| 3,078,287 | 2/1963 | Downing | 260—412.6 |

JAMES H. TAYMAN, JR., *Primary Examiner.*